Patented Dec. 17, 1935

2,024,235

UNITED STATES PATENT OFFICE 2,024,235

METHOD OF ATTACHING RUBBER SOLES TO SHOES

Alexander D. Macdonald, Malden, Mass., assignor to Boston Blacking & Chemical Co., Boston, Mass., a corporation of Massachusetts No Drawing. Application November 30, 1934, Serial No. 755,368

5 Claims. (Cl. 12—142)

This invention relates to the adhesive attachment of shoe parts and more particularly to the securing of rubber soles to shoe bottoms, and especially to the bottoms of fabric shoes.

An object of this invention is to provide an improved method of adhesively securing rubber soles to shoe bottoms, especially of fabric shoes, whereby a secure and improved attachment may be obtained.

Other objects of the invention will be apparent to those skilled in the art to which this invention appertains from the accompanying disclosure and claims.

In the accomplishment of the above and other objects, I have provided a method wherein an aqueous dispersion containing in the dispersed phase rubber and an organic solvent for rubber is applied to the attaching surface of a rubber sole, and permitted to dry to a substantially transparent film An anti-oxidant for rubber is preferably dissolved in the rubber solvent. A rubber adhesive is also applied to the overlasted portion of the shoe bottom and permitted to dry, and where the shoe upper is of fabric, the adhesive is desirably of the same nature as that applied to the sole. The dry adhesive on the shoe parts is then activated, the rubber sole and shoe bottom brought into juxtaposition, and the assemblage placed under pressure.

The aqueous dispersion may be rubber latex, to which has been added an aqueous emulsion of rubber solvents, preferably toluene and tri-chlorethylene. Phenyl-beta-naphthylamine is a preferred anti-oxidant, and desirably is dissolved in said solvents. The activation of the dried rubber is preferably accomplished by a dilute solution of rubber in an organic solvent, which solution may also contain additional anti-oxidant, for example, phenyl-beta-naphthylamine.

In carrying out the invention in a preferred manner, the shoe bottom and sole are first prepared mechanically for the application of adhesive thereto. The overlasted margin of the fabric upper may be prepared by roughing the surface of the fabric with a small emery wheel. To prepare the sole, the marginal portion of the attaching surface thereof may be roughed with an emery paper wheel. This mechanical preparation of the shoe bottom and sole is not necessary in all cases and may be varied depending upon the previous condition thereof, but in general I find that a more secure and satisfactory attachment of sole to shoe bottom is accomplished by such preliminary mechanical preparation.

There is then applied to the mechanically prepared surfaces of the shoe bottom and sole an adhesive composition of the following nature:

| | |
|---|---|
| Latex (containing 60% rubber by weight) | 86.6 gals. |
| Phenyl-beta-naphthylamine | 3.7 lbs. |
| Toluene | 2.2 gals. |
| Tri-chlor-ethylene | 6.9 gals. |
| Nekal | 1.7 lbs. |
| Water | 4.8 gals. |

Yield: approximately 100 gallons.

The above composition, which has a rubber content of about 50% by weight, may be prepared by dissolving the phenyl-beta-naphthylamine in a mixture of the toluene and tri-chlor-ethylene. This solution may then be emulsified in a solution of the Nekal in water. The resulting emulsion may then be mixed with the latex.

In the above composition the latex serves as a source of rubber, the adhesive material of the composition. The phenyl-beta-naphthylamine is an anti-oxidant and increases the aging properties of the rubber. The toluene and tri-chlor-ethylene are rubber solvents and also solvents for the anti-oxidant. Toluene is readily emulsified and aids in the emulsification of other solvents associated therewith. The tri-chlor-ethylene associates readily with the rubber particles and assists in associating the dissolved anti-oxidant with the rubber. The Nekal is an emulsifying agent which assists in dispersing the rubber solvents in water.

After the adhesive composition has dried to form a substantially transparent film of rubber, an activating composition is applied to said rubber films and permitted to stand for a short period of time, such as 10 or 15 seconds, whereupon the sole and shoe upper and brought together in juxtaposition, and the assembled parts placed under a relatively high sole-attaching pressure, for example, 80 pounds per square inch, for a short period of time, such as about 1 minute.

The activating solution of this invention may have the following composition:

| | |
|---|---|
| Crepe rubber | 6.6 lbs. |
| Hot rolled crepe rubber | 5.3 lbs. |
| Benzol | 100.5 gals. |
| Phenyl-beta-naphthylamine | 0.1 lb. |

Yield: approximately 100 gallons.

In the above composition the hot rolled crepe rubber provides rubber in small particle size which when dissolved forms a solution of low viscosity. The crepe rubber associated therewith imparts strength to the rubber deposited from the solution.

The benzol is the rubber solvent, and the phenyl-beta-naphthylamine is the anti-oxidant.

The use of an activating solution of the above type to the adhesive composition renders more certain the adhesiveness of the rubber over the entire areas to be cemented, thus substantially eliminating so-called dry joints and providing an adhesive union of rubber sole to fabric upper of great strength and uniformity.

Tests have shown the adhesive union between sole and shoe bottom produced according to this invention to be considerably greater than by the use of ordinary rubber or latex cements. Moreover, by the use of the procedures and compositions disclosed herein, an adhesive attachment of rubber sole to fabric shoe is provided particularly suited to withstand conditions of actual wear.

Having described my invention, what I claim as new and desire to secure by Letters Patent of the United States is:

1. The method of attaching rubber soles to shoe bottoms which comprises applying to the attaching surface of the rubber sole an aqueous dispersion containing in the dispersed phase rubber and an organic solvent for rubber, applying a rubber adhesive to the overlasted portion of the shoe bottom, permitting the applied compositions to dry, activating the deposited material with a rubber solvent, bringing the rubber sole and shoe bottom into juxtaposition, and placing the assemblage under pressure.

2. The method of attaching rubber soles to shoe bottoms which comprises applying to the attaching surface of a rubber sole an aqueous dispersion containing in the dispersed phase rubber and an anti-oxidant, applying a rubber adhesive to the overlasted portion of the shoe bottom, permitting the applied compositions to dry to a substantially transparent film, activating said film, bringing the rubber sole and the shoe bottom into juxtaposition, and placing the assemblage under pressure.

3. The method of attaching rubber soles to shoe bottoms which comprises applying to the attaching surface of a rubber sole and to the overlasted portion of the shoe bottom an aqueous dispersion containing in the dispersed phase rubber, phenyl-beta-naphthylamine, and an organic solvent for rubber, permitting the applied compositions to dry to substantially transparent films, activating said films with a solution of rubber in an organic solvent, bringing the sole and shoe bottom into juxtaposition, and placing the assemblage under pressure.

4. The method of attaching rubber soles to fabric shoe bottoms which comprises applying to the attaching surface of the rubber sole and to the overlasted portion of the shoe bottom rubber latex containing an aqueous emulsion of an anti-oxidant dissolved in an organic solvent for rubber, permitting said composition to dry to substantially transparent films, subsequently activating said films, bringing the sole and shoe bottom into juxtaposition, and placing the assemblage under pressure.

5. The method of attaching rubber soles to fabric shoe bottoms which comprises applying to the attaching surface of the rubber sole and to the overlasted portion of the shoe bottom rubber latex containing an aqueous emulsion of toluene and tri-chlor-ethylene, permitting said composition to dry to substantially transparent films, activating said films with a dilute solution of rubber and an organic solvent, bringing the sole and shoe bottom into juxtaposition, and placing the assemblage under pressure.

ALEXANDER D. MACDONALD.